United States Patent [19]

Broese et al.

[11] Patent Number: 5,600,758
[45] Date of Patent: Feb. 4, 1997

[54] METHOD AND DEVICE FOR CONDUCTING A PROCESS IN A CONTROLLED SYSTEM WITH AT LEAST ONE PRECOMPUTED PROCESS PARAMETER.

[75] Inventors: Einar Broese; Otto Gramckow, both of Erlangen; Thomas Martinetz, Munich; Guenter Soergel, Nuernberg, all of Germany

[73] Assignee: Siemens Aktiengesellschaft, Munich, Germany

[21] Appl. No.: 337,660

[22] Filed: Nov. 10, 1994

[30] Foreign Application Priority Data

Nov. 11, 1993 [DE] Germany .......................... 43 38 607.5

[51] Int. Cl.$^6$ ............................... G06E 1/00; G06E 3/00
[52] U.S. Cl. ..................... 395/21; 364/148; 364/157
[58] Field of Search ............................... 395/21; 364/148, 364/157

[56] References Cited

FOREIGN PATENT DOCUMENTS

| | | |
|---|---|---|
| 4040360A1 | 6/1991 | Germany . |
| 4111354A1 | 10/1992 | Germany . |
| 4130164A1 | 3/1993 | Germany . |
| 1794516A1 | 2/1993 | Russian Federation . |
| 442459 | 12/1974 | U.S.S.R. . |
| 807211 | 2/1991 | U.S.S.R. . |

OTHER PUBLICATIONS

Silvestrini, et al., "Autoadaptive process control of a Sendzimir mill at ILVA," *Iron and Steel Engineer,* pp. 50–55 (Aug. 1993).

Sun, et al., "A Hybrid Neural Network Model for Solving Optimization Problems," *IEEE Transactions on Computers,* vol. 42, No. 2, pp. 218–227 (Feb. 1993).

*Primary Examiner*—Robert W. Downs
*Assistant Examiner*—A. Katbab
*Attorney, Agent, or Firm*—Kenyon & Kenyon

[57] ABSTRACT

Known methods for conducting a process in an automatically controlled system preset the system at the beginning of each process run based on at least one process parameter. The process parameter is precomputed with a model of the process which is supplied with input values. During the process the input values and the process parameter are measured and are used to adaptively improve the precomputed process parameter after the process run. The present invention simplifies and improves the precomputed value of the process parameter by supplying at least part of the input values to a neural network. The network response of the neural network forms a correction value for the approximate value delivered by the model for the process parameter to be precomputed. The network parameters of the neural network are modified after each process run to adapt the precomputed value to the actual process events.

26 Claims, 4 Drawing Sheets

METHOD AND DEVICE FOR CONDUCTING A PROCESS IN A CONTROLLED SYSTEM WITH AT LEAST ONE PRECOMPUTED PROCESS PARAMETER.

BACKGROUND OF THE INVENTION

The present invention relates to a method for conducting a process in an automatically controlled system. At least one selected process parameter is precomputed at the beginning of a process run. A mathematical model of the process, supplied with input values and implemented in a computing means, is used to precompute the at least one process parameter. The system is preset with the precomputed process parameter. The input values and the process parameter are measured during the process. After the process, the precomputed process parameter is adaptively improved based on the measured process parameter and based on the measured input values supplied to the model. The present invention also relates to a device for implementing a control method.

A method and device for conducting a quasicontinuous process in an automatically controlled system are discussed in the German Patent Application No. 40 40360. Such processes typically include rolling trains wherein each pass of the rolled strip forms a process cycle (hereinafter "a process run"). Like all actual industrial processes, these process runs are time-variable. In conducting such processes, the system controlling the process must be preset before each run. Therefore, unlike traditional closed-loop control, control must precede the actual process. The control system is preset because in industrial processes, controlled values can often be measured only indirectly and not directly at the point where the process is affected. Therefore, direct closed-loop control is not possible in these instances.

The system controlling the process is preset, in a known manner, by precomputing selected process parameters according to pre-established input values, or initially estimated input values, or both, based on a pool of relevant mathematical models of the process. The system is preset using these parameters. Since mathematical models of the process to be conducted can only approximately define the actual process, the model must be adapted to the actual process events. To adapt the model, the process parameters and the input values are measured directly, or indirectly by precomputing other measured values, during each process run.

When the process run is complete, the precomputation performed with the mathematical models is repeated within the framework of a postcomputation done based on the input values measured at that time. The variable model parameters of the mathematical model are adaptively modified, based on the deviation between the computed process parameters and the measured process parameters, to reduce the deviations. The model parameters thus adapted are available at the beginning of the following process run for precomputing the process parameters.

Despite adapting the process model, the quality of the precomputed values of the process parameters, and thus of the presetting of the system, depends mainly on the quality of the model assumptions. As a rule, the model assumptions are difficult to make and may be subject to errors. Furthermore, adapting the model parameters to the model run continuously and in real time, i.e., on-line, requires a great amount of computing resources.

The goal of the present invention is to improve the precomputed values of the process parameters.

SUMMARY OF THE INVENTION

The present invention achieves this goal by linking, in a method for calculating the process parameter of the aforementioned type, the computed result of the mathematical model with the network response of a neural network. At least part of the input values is supplied to the input of the neural network. After the process run, the deviation between the calculated process parameter and the measured process parameter is used to adapt the variable network parameters of the neural network to reduce the deviation. Accordingly, the corresponding device has a neural network with variable network parameters for adaptively improving the computed results delivered by the model, with at least part of the measured input values being supplied to the input of the neural network.

A linkage means is provided for linking the computed result, delivered by the model, to the network response of the neural network. Of the input values used for computing the model, the neural network supplies those input values whose effect on the process parameter to be precomputed is not described by the model with sufficient accuracy.

The process to be conducted is described, as previously, by the mathematical model. However, the residual model error is not corrected by adapting the model to the actual process events as was previously done. Instead, the residual model error is corrected via the neural network connected, in parallel, to the model. Thus, the mathematical model delivers an approximate value for the process parameter to be precomputed and the neural network delivers a correction value. Linking the approximate value with the correction value improves the prediction of the process parameter.

The method of the present invention is advantageous compared with the well-known method of exclusively using of a mathematical model because designing and training the neural network is less expensive than qualifying the mathematical model. The present invention is also advantageous compared with replacing the mathematical model entirely with a neural network because prior results and experience continue to be valid for mathematical process modeling. Accordingly, the method of the present invention, which uses the neural network combined with the mathematical model, is also simpler than a corresponding overall neural network, resulting in better solutions for conducting the process.

The present invention permits the network parameters to be adapted on-line. The present invention does so by using the measured input values and the measured process parameters after each process run to adapt the network parameters. Thus, the correction of the computed results delivered by the model is constantly adapted to the actual, i.e., time-variable process. Adapting the network parameters of the neural network on-line uses less computing resources than adapting the model parameters of the mathematical model on-line.

In addition to adapting the neural network online, the mathematical model can also be adapted to the process by adaptively modifying, at least after a plurality of process runs, the variable model parameters of the mathematical model based on the deviation between the computed results delivered by the model and the measured process parameters. In this case, the model is preferably adapted off-line because the measured values of the input values and process parameters are gathered over a plurality of process runs.

Various ways of linking the computed results of the model with the network response of the neural network are conceivable. Additive linkage, multiplicative linkage and dual linkage are especially advantageous.

The method according to the present invention is particularly well suited for processes which can be approximately described by a model. For example, rolling processes can be conducted using the method of the present invention. In this instance, the method of the present invention is specifically used for precomputing and presetting the rolling force in rolling stands of a rolling train, or for precomputing and presetting the temperature variation in the rolled strip, or both.

When used with quasi-continuous processes, the method of the present invention functions as a closed-loop control circuit timed in the natural cycle of the process runs. Analogously, continuous processes can be automatically controlled by introducing pseudo process cycles. Similarly, the natural process cycle of quasi-continuous processes can also be subdivided into shorter pseudo process cycles.

BRIEF DESCRIPTION OF THE DRAWINGS

The invention is explained in detail below using the figures of the drawing.

DETAILED DESCRIPTION

Figure 1:
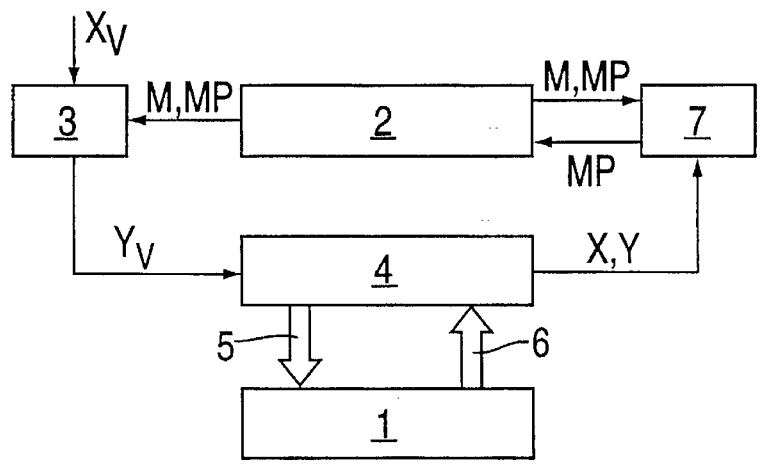
FIG. 1 is a block diagram which illustrates a known arrangement for conducting an industrial process, including a mathematical model of the process for presetting a system controlling the process.

FIG. 1 is a block diagram which shows a conventional arrangement for conducting an industrial process, for example, a rolling process. The industrial process is denoted by a function block 1. A mathematical model M of the process, including the associated model parameters MP, is implemented in a computing means 2. Before each process run is started, a precomputing means 3 extracts the necessary model equations of mathematical model M and the current model parameters MP from computing means 2. Selected process parameters $Y_v=(Y_{1v}, \ldots, Y_{nv})$ are precomputed in precomputing means 3 based on the equations of model M and based on the given or estimated input values $x_v=(x_{1v}, \ldots, x_{nv})$, for example, reference values. A system 4 for controlling process 1 is preset with these precomputed process parameters $y_v$. During the subsequent process run, process 1 is controlled by preset system 4, as indicated by arrow 5. Also during the process run, all essential process values are measured, as indicated by arrow 6. Based on the measured process values, input values x and process parameters y are determined by statistically preparing the measured values or by computing other, not directly measurable values. The determined input values x and process parameters y are much more accurate than the values precomputed before the process run. After the process run, the input values x thus measured and process parameters y are supplied to a postcomputing means 7. The post computing means 7 accesses the mathematical model M with the current model parameters MP in computing means 2 and iterates the precomputation based on the measured input values x. The computed results thus obtained for the process parameters are compared with the measured process parameters y, and based on the deviations observed, model parameters MP are adaptively modified to reduce the deviations. The adapted model parameters MP are stored in computing means 2 for use in the next precomputation. The adapted model parameters MP overwrite the older values.

Figure 2:
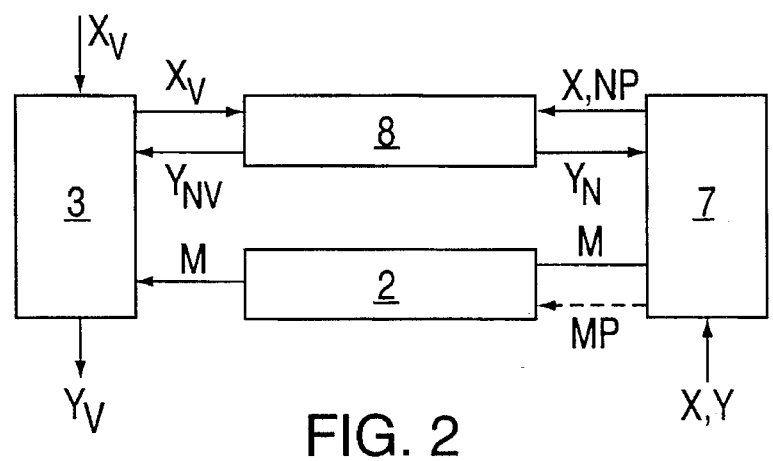
FIG. 2 is a block diagram which shows an example for combining the mathematical model with a neural network according to the present invention.

FIG. 2 is a block schematic which shows an example of embodiment of the present invention which combines the mathematical model in computing means 2 with a neural network 8 having variable network parameters NP. When precomputing process parameters $y_v$, precomputing means 3 not only accesses the mathematical model in computing means 2, but also supplies estimated input values $x_v$ to neural network 8. The neural network 8 produces a network response $y_{vN}$ to the precomputing means 3. The precomputing means 3 links the network response $Y_{Vn}$, to the computed results delivered by mathematical model M to form process parameters $y_v$ to be precomputed. The system 4 is preset for controlling process 1 using the precomputed process parameters $Y_v$, as described in connection with FIG. 1. After the process run, the measured input values x are supplied to mathematical model M in postcomputing means 7 and to neural network 8. Subsequently, the computed result of mathematical model M thus obtained and network response $y_N$ are linked together in the post computing means 7. The result of the linkage is compared with the measured process parameters. Depending on the deviations observed, the variable network parameters NP of neural network 8 are adaptively modified to reduce the deviation.

In contrast with the neural network 8, which is adapted, on-line, after each process run, mathematical model M is not adapted on-line. However, gathering the measured results from a plurality of process runs and adapting the mathematical model M off-line at given points in time, as indicated by the dashed line between computing means 2 and post computing means 7, is possible for transferring updated model parameters MP.

Figure 3:
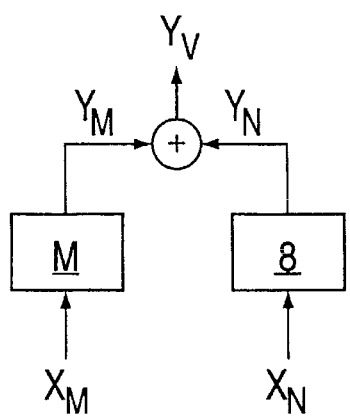
FIG. 3 is a block schematic in which the network response is additively linked with the computed result of the model.
Figure 4:
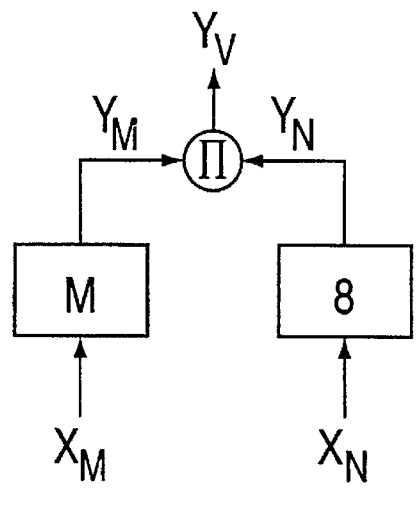
FIG. 4 is a block schematic in which the network response is multiplicatively linked with the computed result of the model.
Figure 5:
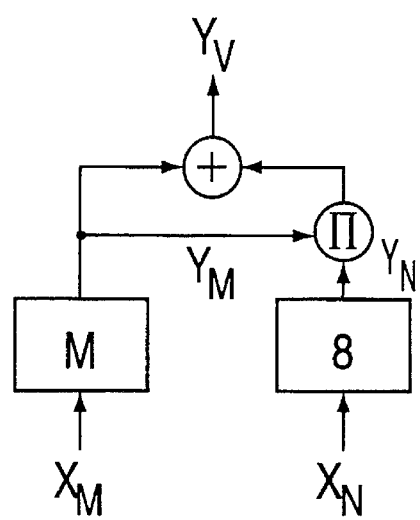
FIG. 5 is a block schematic in which the network response is linked with the computed result of the model in two ways.

FIGS. 3, 4 and 5 show different examples of linking the computed results $Y_M$, obtained by mathematical model M based on input values $x_M$ supplied to it, with network response $y_N$, of neural network 8 provided with input values $x_N$. Input values $x_N$ include values whose influence on the process parameters $y_v$ to be precomputed cannot be accurately described by the mathematical model. In many cases $x_M=x_N$. In particular, FIG. 3 shows an additive linkage $y_v=y_M+y_N$; FIG. 4 shows a multiplicative linkage $y_v=y_M \cdot y_N$, and FIG. 5 shows a dual linkage $y_v=y_M \cdot (1+y_N)$. Thus, process parameters $y_v$ are approximately calculated by mathematical model M, and the residual model error is corrected by neural network 8. The precomputed values of the process parameters $y_v$ are adapted to the actual process events by adaptively modifying the network parameters of neural network 8.

FIGS. 6 through 9 show several examples of neural networks whose application, in combination with mathematical models, for describing a process is explained in detail below.

One example of controlling industrial processes is process automation in a rolling mill. In this instance, the actual controlled value, namely the thickness of the rolled strip exiting the rolling train in the roll gap, cannot be measured. Rather, the actual controlled value can only be determined indirectly according to the set values. In this instance, the set values include the screw-down in the corresponding rolling stand and of one or more process parameters such as the rolling force. Since the rolling force can be measured during the process run, the actual value of the control value can be calculated at all times and thus the control to obtain the set value is feasible.

In the initial phase of each process run, i.e., at the beginning of each individual rolling step, the control must first be stabilized. This causes an erroneous thicknesses in the initial portion of the rolled product. To minimize the stabilization phase of the control thereby minimizing the initial portion of the rolled product with erroneous thickness, the set values are preset, before feeding the product into the rolling train, using the set value for the control parameter (strip thickness) and a precomputed value of the process parameter (rolling force). The rolling force is precomputed using a mathematical model simulating the relationship between the rolling force (process parameter y) and the input values x that influence it such as the relative thickness reduction $E_n$ of the rolled strip in rolling stand n, entry temperature $T_n$ of the rolled strip, tension $Z_n$ in the rolled strip before stand n, tension $Z_n+1$ in the rolled strip after stand n, roll radius $R_n$, width $B_n$ and thickness $D_n$ of the rolled strip before stand n.

Figure 6:
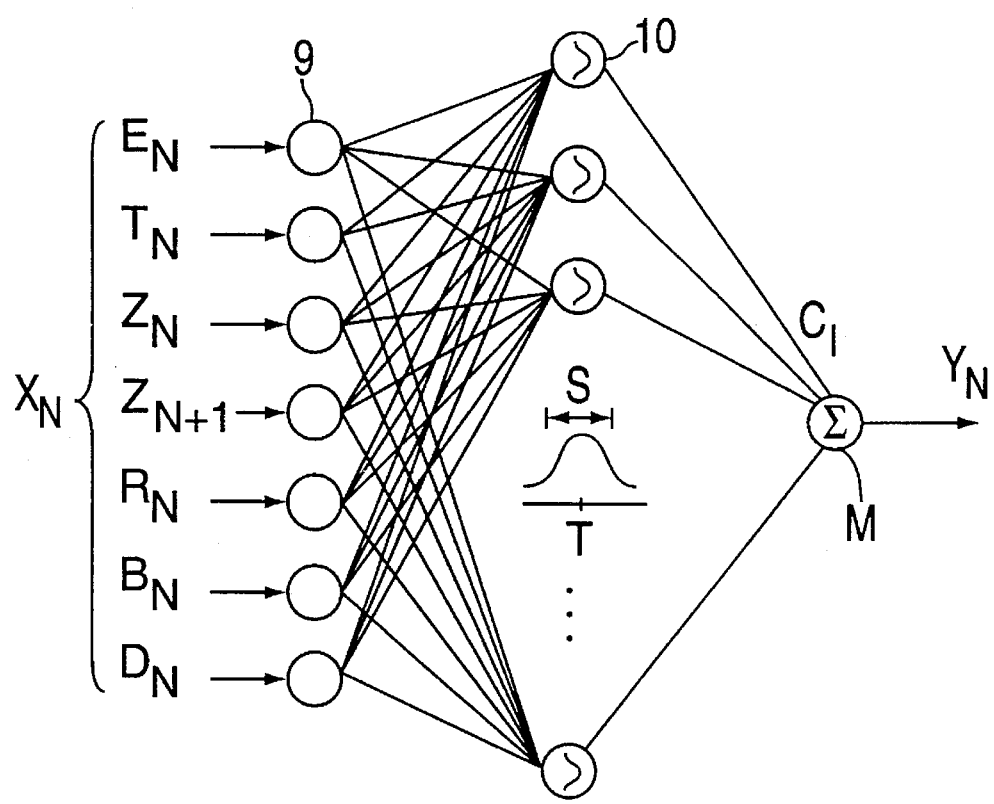
FIGS. 6 through 9 show different examples of neural networks.

FIG. 6 shows the structure of a neural network having an input supplied with the aforementioned input values $x_N=(E_n, \ldots, D_n)$. The output response $y_N$ of the neural network is linked to the computed result $y_M$ delivered by mathematical model M additively or dually as illustrated in FIGS. 3 or 5, respectively. The neural network shown in FIG. 6 has an input layer with one input element 9 for each of input values through $D_n$. The input layer is coupled with a concealed layer consisting of i elements 10, each with Gaussian curve-shaped response characteristics. Each of the responses of the i individual elements 10 is multiplied by an associated weighing factor $c_i$ to form i weighted responses. An output element 11 sums the i weighted responses to form network response $y_N$. The response characteristic of each individual element 10 of the concealed layer describes a multidimensional Gaussian curve depending on the number of input values with a variable center $t_{ij}$, a variable width $s_j$ and an amplitude that can be modified by weighing factor $c_i$. The neural network is adapted to the actual process events using these network parameters.

Figure 7:
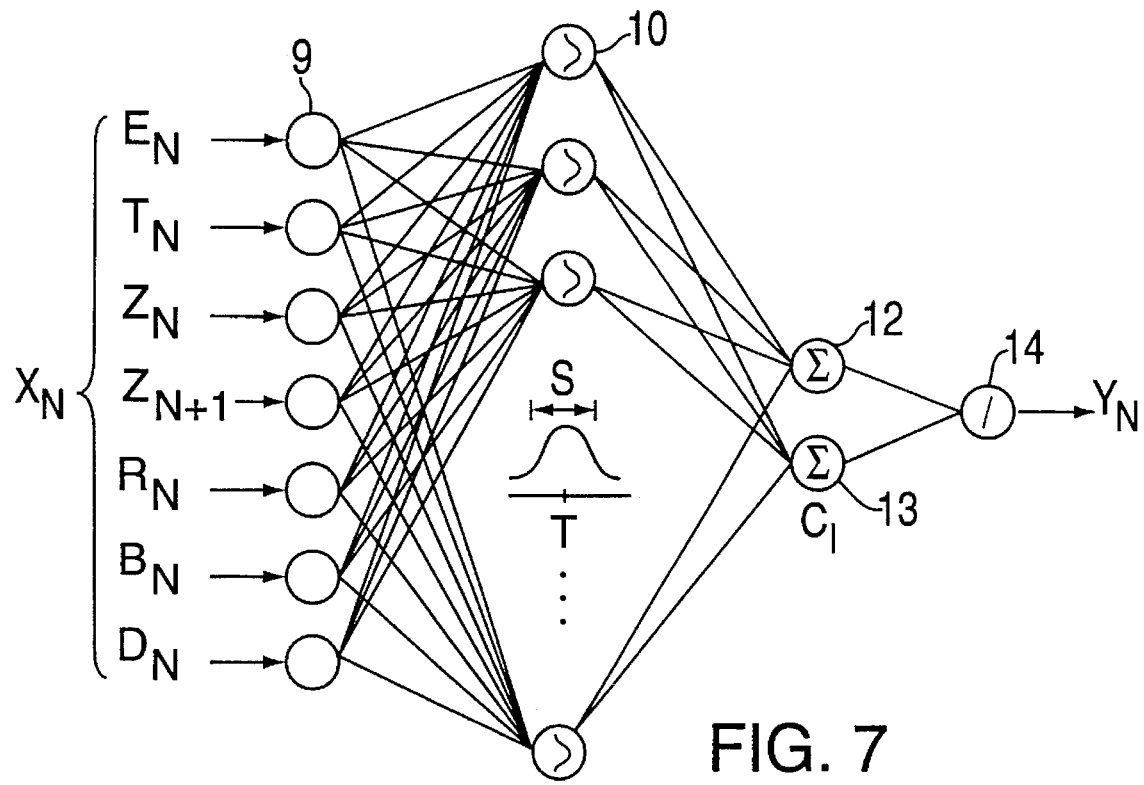

The neural network shown in FIG. 7 is suitable for multiplicatively linking network response $y_N$ with the result of the model computation $Y_M$. The neural network of FIG. 7 differs from the network shown in FIG. 6 by a second concealed layer consisting of two summing elements 12 and 13. The summing element 12 adds the unweighted responses of the individual elements 10 of the first concealed layer, while the summing element 13 adds up the responses after they have been multiplied with the corresponding weighing factor $c_i$. An output element 14 forms network response $y_N$ from a relationship of the responses delivered by summing elements 12 and 13, and is connected after the second concealed layer.

Figure 8:
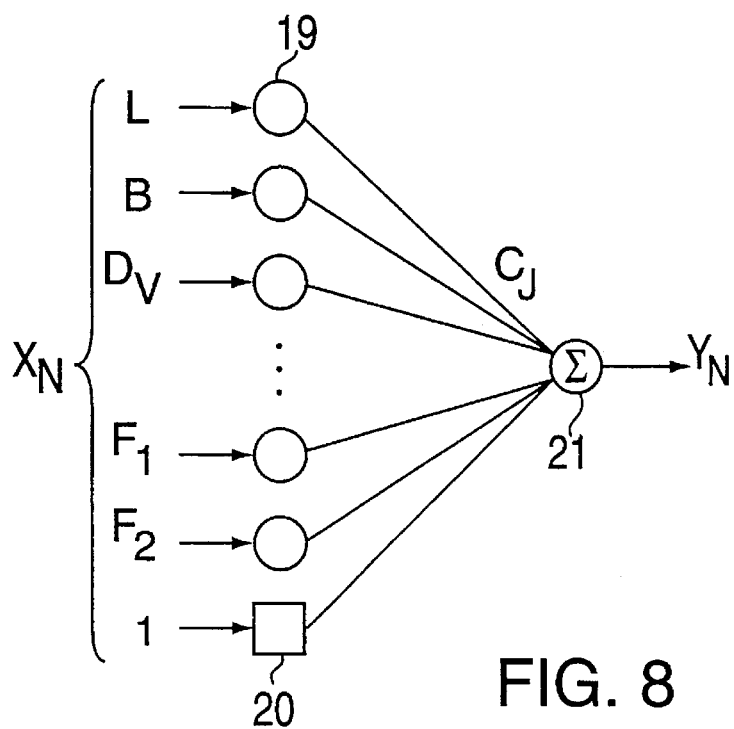
Figure 9:
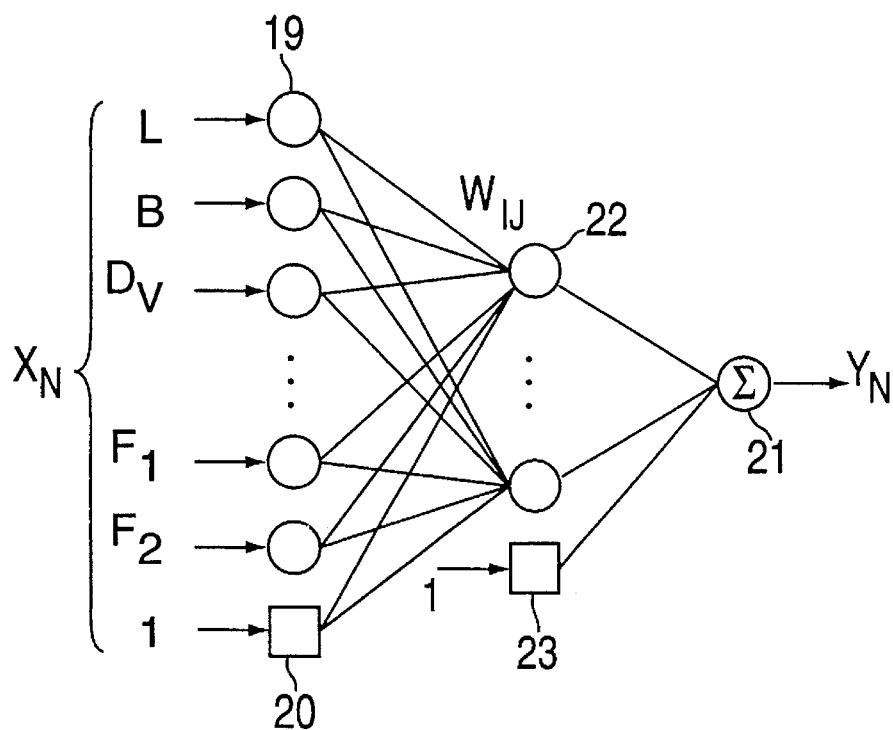
Figure 10:
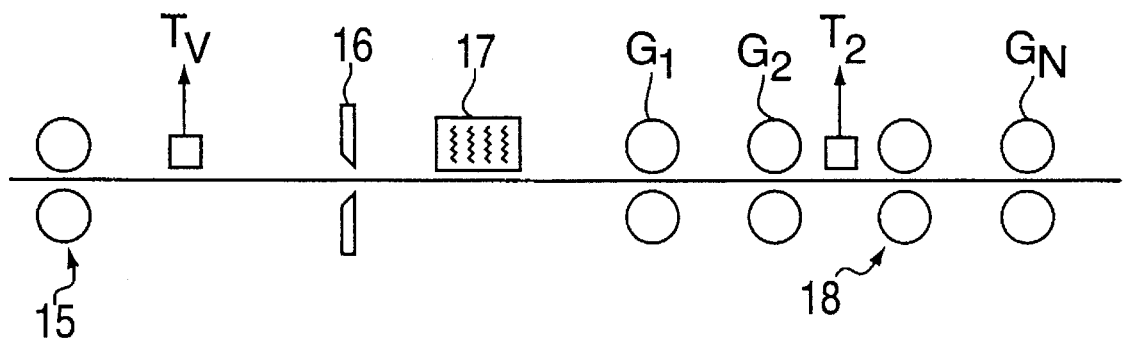
FIG. 10 illustrates the method of the present invention as applied to a rolling train.

FIGS. 8 and 9 show two examples of neural networks which, which combined with mathematical models, can be used for modeling the temperature variation in the rolled strip when passing through the rolling train. The network response $y_N$ of the neural network is additively linked with computed result $y_M$ of the mathematical model. The corresponding temperature model consists of a plurality of partial models such as the model of temperature variation within a rolling stand and the cooling of the rolled strip outside the rolling stands. FIG. 10 shows a section of a rolling train with a roughing train 15, a shearing machine 16, a scale washer 17 and a finishing train 18, whose individual rolling stands are denoted with $G_1, G_2, \ldots, G_n$.

For train areas between two reliable temperature measuring points, for example, between the measuring point for the entry strip temperature $T_v$ and the measuring point for the strip temperature $T_2$ after the second rolling stand $G_2$, the temperature coefficient should be determined from the mathematical temperature model, using the neural network for error compensation. Preferably the following input values $x_N$ are supplied to the neural network: sum of the alloy contents L in the rolled strip, strip width B, entry strip width $D_v$, strip width $D_2$ after the second stand $G_2$, entry strip temperature, strip temperature after the second stand $G_2$, travel time $t_A$ from the measuring point of the entry strip temperature $T_v$ to shearing machine 16, travel time $t_B$ from scale washer 17 to the first stand $G_1$, cooling intensity $I_A$ of scale washer 17, intensity of the press water strip cooling $I_B$ between the two stands $G_1$ and $G_2$, intensity $I_c$ of the roll cooling and roll speeds $v_1$ and $v_2$, as well as rolling forces $F_1$ and $F_2$ in rolling stands $G_1$ and $G_2$.

The neural network shown in FIG. 8 has an input layer, which has one input element 19 for each of the aforementioned input values $x_N=(L, B, D_v, \ldots, F_1, F_2)$. A constant value, e.g. "1", is supplied to an additional input element 20. The input values $x_N$ and the constant value are multiplied by the individual weighing factors $c_j$ and summed to form a network response $y_N$ in an output element 21.

The neural network shown in FIG. 9 differs from that in FIG. 8 because it further includes an intermediate layer consisting of i (e.g., i=20) elements 22, each having a response characteristic in the form of a sigmoid curve between −1.0 and +1.0. Each of the input values $x_N$ is multiplied by individual weighing factor $w_{ij}$ and then summed before being supplied to individual elements 22. The concealed layer has another element 23, which serves as an input element for a constant value, e.g., "1."

What is claimed is:

1. A method for controlling a process with a computing means having a mathematical model of the process and with a neural network having variable network parameters, the method comprising steps of:

a) supplying input values to the mathematical model;

b) precomputing at least one selected process parameter with the mathematical model at the beginning of a process run, based on the input values supplied to the mathematical model;

c) presetting the at least one process parameter;

d) measuring the input values and the at least one process parameter during the process; and e) adaptively improving the at least one process parameter after the process based on the measured at least one process parameter and based on the measured input values, the step of adaptively improving including sub-steps of:

I) supplying at least part of the measured input values to the mathematical model;

ii) supplying at least part of the measured input values to the neural network;

iii) forming a computed at least one process parameter with the mathematical model;

iv) forming a network response with the neural network;

v) linking the computed at least one process parameter with the network response to form a linked result;

vi) comparing the linked result with the measured process parameter to form a deviation; and vii) adaptively modifying the variable network parameters of the neural network such that the deviation is reduced, the variable network parameters being adaptively modified to train the neural network on-line.

2. The method of claim 1 wherein the variable network parameters of the neural network are adaptively modified on-line, after each process run, using the measured input values and the measured process parameters.

3. The method of claim 1 further comprising a step of additionally adaptively modifying variable model parameters of the mathematical model after a plurality of process runs, and based on a deviation between the measured process parameters and a result computed by the mathematical model.

4. The method of claim 3 wherein the variable model parameters of the mathematical model are additionally adaptively modified off-line.

5. The method of claim 1 wherein the sub-step of linking is additive linking.

6. The method of claim 1 wherein the sub-step of linking is multiplicative linking.

7. The method of claim 1 wherein the sub-step of linking is dual linking.

8. The method of claim 1 wherein the process is a rolling process.

9. The method of claim 8 wherein the at least one selected process parameter precomputed and preset includes a rolling force in rolling stands of a rolling train.

10. The method of 8 wherein the at least one selected process parameter precomputed and preset includes a temperature variation of a rolled strip.

11. The method of claim 1 wherein the at least part of the measuring input values supplied to the neural network include values whose influence on the at least one process parameter cannot be accurately described by the mathematical model.

12. An arrangement for conducting a process in a controlled system, the arrangement comprising:

a) means for presetting the system based on at least one precomputed process parameter;

b) a computing means including a mathematical model of the process for precomputing the at least one process parameter based on input values;

c) means for measuring input values and process parameters during the process;

d) a neural network, the neural network
  i) having variable network parameters,
  ii) adaptively modifying the at least one process parameter precomputed by the computing means, the at least one process parameter being adaptively modified to train the neural network on-line,
  iii) being supplied with at least part of the input values measured by the means for measuring, and
  iv) providing a network response based on its variable network parameters and based on the at least part of the input values; and e) means for linking the at least one process parameter precomputed by the computing means with the network response of the neural network the linked result being provided to the computing means for adapting the at least one process parameter.

13. A method for estimating at least one process parameter of a process, the at least one process parameter used for controlling the process, the method comprising the steps of:

a) supplying model input values to a computing means implementing an analytical process model of the process;

b) determining at least one estimated computed value of the at least one process parameter using the analytical process model, the analytical process model determining the at least one estimated computed value based on the model input values;

c) providing network input values to a neural network structure;

d) forming at least one network response value associated with the at least one process parameter using the neural network structure, the neural network structure forming the at least one network response value based on the model input values;

e) linking at least one estimated computed value to the at least one network response value for generating at least one estimated process parameter value associated with the at least one process parameter; and (f) providing the estimated process parameter value to a controller for controlling the process.

14. The method of claim 13, wherein the at least one estimated process parameter value is generated by adding the at least one estimated computed value to the at least one network response value.

15. The method of claim 13, wherein the at least one estimated process parameter value is generated by multiplying the at least one estimated computed value by the at least one network response value.

16. The method of claim 13, wherein the at least one estimated process parameter value is generated by adding one to the at least one network response value for forming a dual linkage value and multiplying the dual linkage value by the at least one estimated computed value.

17. The method of claim 13, wherein the model input values and the network input values both include at least one shared element value associated with the at least one process parameter.

18. The method of claim 17, wherein the model input values and the network input values are identical.

19. The method of claim 13, further comprising the step of:

f) adaptively modifying the at least one process parameter for on-line training of the neural network.

20. The method of claim 13, wherein the at least one network response value associated with the at least one process parameter includes one on-line training value for on-line training the neural network structure.

21. The method of claim 13, further comprising the step of:

g) training the neural network structure based on a difference between the at least one estimated process parameter value and the at least one network response value.

22. The method of claim 13, wherein the process is preset with the at least one network response value, the process including a rolling train process.

23. The method of claim 22, wherein the rolling train process is controlled by a rolling train, the rolling train having a rolling grip, the rolling grip having a thickness profile which corresponds to the at least one network response value.

24. The method of claim 13, wherein the process is controlled by a controller, the at least one network response value being supplied to the controller, the process including a rolling train process.

25. The method of claim 13, wherein the process includes rolling processes.

26. The method of claim 13, wherein the least one estimated process parameter value, the at least one estimated computed value and the at least one network response value are all formed as future values for the at least one process parameter of the process.

* * * * *